(12) United States Patent
Peng et al.

(10) Patent No.: US 10,162,115 B2
(45) Date of Patent: Dec. 25, 2018

(54) HIGH ISOLATION AND HIGH RETURN LOSS 2-PORT OPTICAL RETRO-REFLECTOR

(71) Applicant: Alliance Fiber Optic Products, Inc., Sunnyvale, CA (US)

(72) Inventors: Bruce Peng, Fremont, CA (US); Andy Zhou, Gremont, CA (US); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 129 days.

(21) Appl. No.: 14/884,729

(22) Filed: Oct. 15, 2015

(65) Prior Publication Data

US 2017/0108404 A1    Apr. 20, 2017
US 2017/0212006 A9    Jul. 27, 2017

Related U.S. Application Data

(60) Provisional application No. 62/122,224, filed on Oct. 16, 2014.

(51) Int. Cl.
*G02B 6/28* (2006.01)
*G02B 6/293* (2006.01)

(52) U.S. Cl.
CPC ......... *G02B 6/2817* (2013.01); *G02B 6/2937* (2013.01)

(58) Field of Classification Search
CPC .............................................. G01M 11/3154
See application file for complete search history.

(56) References Cited

U.S. PATENT DOCUMENTS

| | | | | |
|---|---|---|---|---|
| 5,754,718 A | * | 5/1998 | Duck | G02B 6/2932 385/102 |
| 5,796,889 A | * | 8/1998 | Xu | G02B 6/2937 372/703 |
| 5,943,149 A | * | 8/1999 | Cearns | H04J 14/02 359/584 |
| 6,112,005 A | | 8/2000 | Liu et al. | |
| 6,185,347 B1 | * | 2/2001 | Zheng | G02B 6/2937 385/16 |
| 6,246,812 B1 | | 6/2001 | Liu et al. | |
| 6,282,339 B1 | * | 8/2001 | Zheng | G02B 6/2937 385/24 |
| 6,347,170 B1 | * | 2/2002 | Zheng | G02B 6/2937 385/16 |
| 6,396,980 B1 | | 5/2002 | Liu et al. | |
| 6,400,862 B1 | | 6/2002 | Liu et al. | |
| 6,498,876 B1 | * | 12/2002 | Liu | G02B 6/2937 385/24 |
| 6,532,325 B2 | | 3/2003 | Liu et al. | |
| 6,535,668 B2 | | 3/2003 | Liu et al. | |
| 6,561,701 B1 | | 5/2003 | Liu et al. | |
| 7,013,069 B1 | | 3/2006 | He et al. | |
| 7,103,246 B1 | | 9/2006 | Zhu et al. | |
| 7,212,343 B1 | | 5/2007 | He et al. | |
| 7,223,026 B1 | | 5/2007 | He et al. | |

(Continued)

*Primary Examiner* — Thomas A Hollweg
*Assistant Examiner* — Guy Anderson
(74) *Attorney, Agent, or Firm* — Robert L. Branham

(57) ABSTRACT

Two-port optical retro-reflectors with high isolation and high return loss are described. Such retro-reflectors are designed to increase the number of optical filtering using one or more filters uniquely disposed to increase the isolation and return loss.

8 Claims, 15 Drawing Sheets

(56) References Cited

U.S. PATENT DOCUMENTS

| | | | | |
|---|---|---|---|---|
| 7,289,733 | B1* | 10/2007 | He | G02B 6/29362 |
| | | | | 398/82 |
| 7,412,124 | B1* | 8/2008 | He | G02B 6/2937 |
| | | | | 385/20 |
| 7,486,891 | B1* | 2/2009 | Yao | G02B 6/29365 |
| | | | | 385/24 |
| 7,912,374 | B1* | 3/2011 | Wang | G02B 3/0087 |
| | | | | 359/634 |
| 8,351,791 | B1* | 1/2013 | Wang | H04J 14/02 |
| | | | | 398/85 |
| 8,873,909 | B1* | 10/2014 | Wang | G02B 6/2937 |
| | | | | 385/31 |
| 2003/0072527 | A1* | 4/2003 | Li | G02B 6/2937 |
| | | | | 385/34 |
| 2003/0185507 | A1* | 10/2003 | Lai | G02B 6/2937 |
| | | | | 385/33 |
| 2004/0086226 | A1* | 5/2004 | Hellman | G02B 6/2937 |
| | | | | 385/33 |
| 2005/0008292 | A1* | 1/2005 | Wang | G02B 6/2937 |
| | | | | 385/33 |
| 2006/0067614 | A1* | 3/2006 | Wang | G02B 6/2937 |
| | | | | 385/24 |
| 2006/0182390 | A1* | 8/2006 | Ji | G02B 6/322 |
| | | | | 385/31 |
| 2011/0235970 | A1* | 9/2011 | Flora | G01M 11/3154 |
| | | | | 385/28 |
| 2012/0134663 | A1 | 5/2012 | Wang et al. | |
| 2013/0330039 | A1* | 12/2013 | Liu | G02B 6/32 |
| | | | | 385/33 |
| 2014/0152979 | A1* | 6/2014 | Flora | G01M 11/3154 |
| | | | | 356/73.1 |

\* cited by examiner

HIGH ISOLATION AND HIGH RETURN LOSS 2-PORT OPTICAL RETRO-REFLECTOR

CROSS-REFERENCE TO RELATED APPLICATION

This application claims the benefits of U.S. Provisional Application No. 62/122,224, filed Oct. 16, 2014, and entitled "High Isolation and High Return Loss 2-Port Optical Retro-Reflector", which is hereby incorporated by reference for all purposes.

BACKGROUND OF THE INVENTION

Field of the Invention

The invention is generally related to the area of optical communications. In particular, the invention is related to high isolation and high return loss 2-Port optical retro-reflector.

The Background of Related Art

In optical network, it is important to have OTDR (optical time-domain reflectometer) to monitor the system operation to detect any possible breakdown or issue in the network. Previously, people have broadly discussed and deployed OTDR monitoring in optical network such as US patent 2012/0134663. At the same time, optical network nowadays has been rapidly developed into smart network with more functional layers and complicated multiple dimensional configurations, and thus monitoring and feedback function of the OTDR signal implementation are ever increasingly demanded.

With multiple layer of network configurations, high isolation and high return loss requirement is inevitably important since each layer is supposed to superimpose the signals one by another and thus any unwanted returned signal shall be degraded and deteriorate the single-to-noise ratio. Furthermore, Next Generation PON (NGPON) is pushing the last mile into individual homes and migrates into much higher speed for optical network such as FTTX (fiber to the x), the premium grade retro-reflector which can provide OTDR function for the multiple layer smart network plays an important role and is in urgent demand.

The present invention disclosure teaches unique devices with high isolation for the data signal that has transmitted through and high return loss in retro-reflected OTDR signal so as to meet the premium grade retro-reflector requirement in multiple layer smart network.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In general, the present invention is related to two-port optical retro-reflectors with high isolation and high return loss. According to one aspect of the present invention, the device is designed to increase the number of optical filtering using one or more filters uniquely disposed to increase the isolation and return loss.

The present invention may be implemented as an individual device, a method and part of system. According to one embodiment, the present invention is an two-port optical retro-reflector comprising: a first port for receiving an incoming signal including a first signal and a second signal; a second port; a first filter designed to transmit the first signal and reflect the second signal; a reflector; and a lens directing the incoming signal to the first filter that transmits the first signal and reflects the second signal, wherein the transmitted first signal impinges upon the reflector to cause a reflected first signal to go through the first filter again before the reflected first signal goes to the second port, and the reflected second signal is coupled to the first port. Depending on implementation, the reflector may be a mirror or a second filter. The first and second filters are identical in optical characteristics.

According to another embodiment, the present invention is a two-port optical retro-reflector comprising: a first port for receiving an incoming signal including a first signal and a second signal; a second port; a first filter designed to transmit the first signal and reflect the second signal; a lens directing the incoming signal to the first filter that transmits the first signal and reflects the second signal, wherein the transmitted first signal is coupled to the second port, and the reflected second signal is coupled to a device including: a single fiber pigtail; a lens; and a second filter, wherein the reflected second signal is impinged upon the second filter via the single fiber pigtail and the lens.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2-10. However, those skilled in the art will readily appreciate that the detailed description given herein with respect to these figures is for explanatory purposes as the invention extends beyond these limited embodiments.

Figure 1:
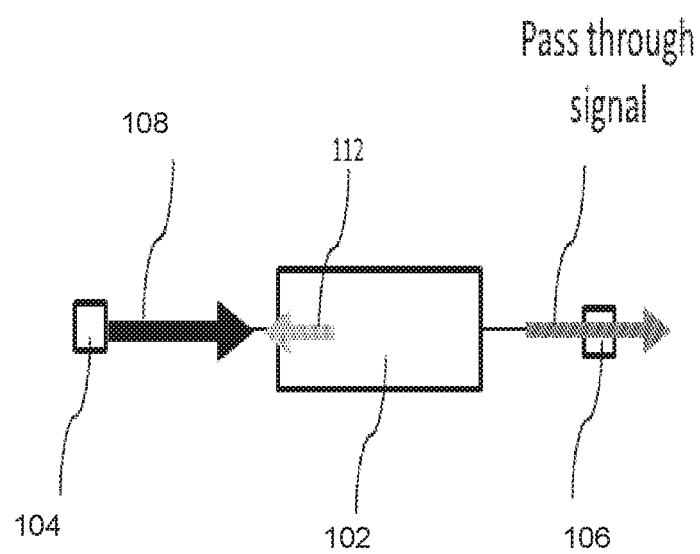
FIG. 1 shows a configuration in which a retro-reflector is coupled between two connectors.

To provide a solution for high isolation and high return loss, a 2-port optical retro-reflector is described herein. Referring now to the drawings, in which like numerals refer to like parts throughout the several views. FIG. 1 shows a configuration 100 in which a retro-reflector 102 is coupled between two connectors 104 and 106, where the connector 104 couples an incoming light signal 108 to an input of the retro-reflector 102 and an output of the retro-reflector 102 is coupled to the connector 106. In operation, when some or all of the incoming signal 108 is transmitted through in the retro-reflector 102, the returned or reflected signal 112 is minimized by the unique designs of the retro-reflector 102.

Figure 2:
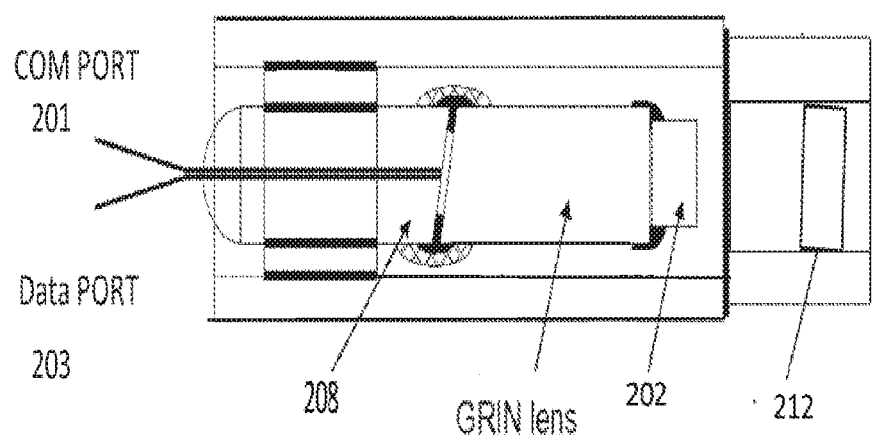
FIG. 2 shows an exemplary embodiment according to one embodiment of the present invention.

FIG. 2 shows an exemplary embodiment according to one embodiment 200 of the present invention. The device includes two ports 201 and 203, wherein the port 201 is also referred to as a com port or com port fiber while the port 203 is referred to as a data port or data port fiber. In operation, an incoming signal (light) is coupled to the com port and impinged upon a lens 210 via a dual fiber pigtail 208. The incoming light then hits an optical filter 202 (e.g., a thin film filter). The optical filter 202 is designed to pass signals at certain wavelengths while reflecting others. The transmitted or passed signal is reflected by a reflector 212. Depending on implementation, the reflector 212 may be a mirror or another optical filter. The passed signal is caused to pass through the filter 202 again, thus increasing the isolation. The twice filtered signed by the filter 202 is led to the data port 203. Meanwhile, the reflected signal by the filter 202 is led to a designated port. As a two-port device, the reflected signal is led to the com port 201. As described below, the passed signal coming out from the data port 203 is referred to as a data signal while the reflected signal is referred to as an OTDR signal.

It is general known in the industry, the thin film filter coating intrinsic reflection isolation can only provide 20 dB and thus the pass-through isolation is only 40 dB in FIG. 2. To increase isolation and return loss, multiple reflections and multiple pass-through in a mini tubular structure are used to achieve the requirement. It should be noted in the description herein that an OTDR signal may also be referred to as a retro reflect signal and a data signal may also be referred to as a pass-through signal. Depending on implementation, an actual device may be very versatile with various wavelength combinations that may be realized by different thin film coatings. For example, the incoming signal carries both OTDR signal (1630-1670 nm) and data signal (1260-1618 nm), the data signal is supposed to pass through the device 200 while the OTDR is supposed to be reflected back to the incoming com port thereof. Without implying any limitations, depending on the filter, the data signal can be a reflected signal while an OTDR signal may also be a passed signal.

Figure 3A:
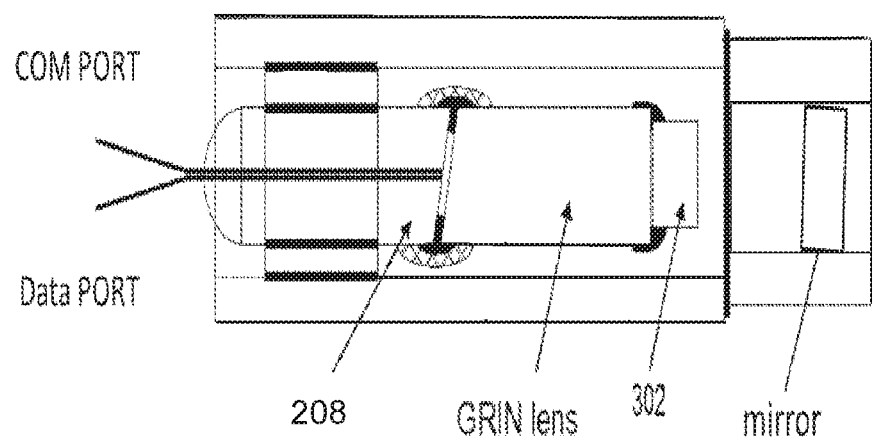
FIG. 3A shows a design with an incoming optical signal of full band going through a com port fiber, a data signal is reflected from a filter, an OTDR signal goes through the filter and is then reflected by a mirror.

Referring now to FIG. 3A, it shows a design with an incoming optical signal of full band (e.g., 1260-1670 nm) going through a com port fiber and a data signal (e.g., 1260-1618 nm) is reflected from a filter 302, an OTDR signal (e.g., 1630-1670 nm) goes through the filter 302 and is then reflected by a mirror. The reflected OTDR signal is then going through the filter 302 again back into the com fiber as a retro signal. With this configuration, it is estimated that it can achieve a high return loss 80 dB for the data signal in retro-reflected OTDR 80 dB but the data port isolation is only 20 dB.

Figure 3B:
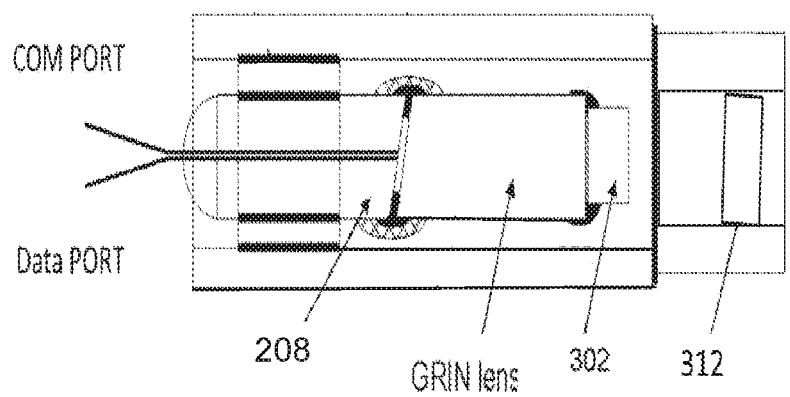
FIG. 3B shows an improvement over FIG. 2A with the change of the mirror to a thin film filter.

FIG. 3B shows an improvement over FIG. 2A with the change of the mirror to a thin film filter, the return loss of data signal retro reflected back to the com port can be improved to 100 dB since the data signal is passed through the filter 302 twice and reflected by the filter 312 once while the data port signal isolation remains 20 dB for this embodiment. Thus this embodiment has 20 dB data port isolation and 100 dB data signal return loss in the retro com port.

Figure 3C:
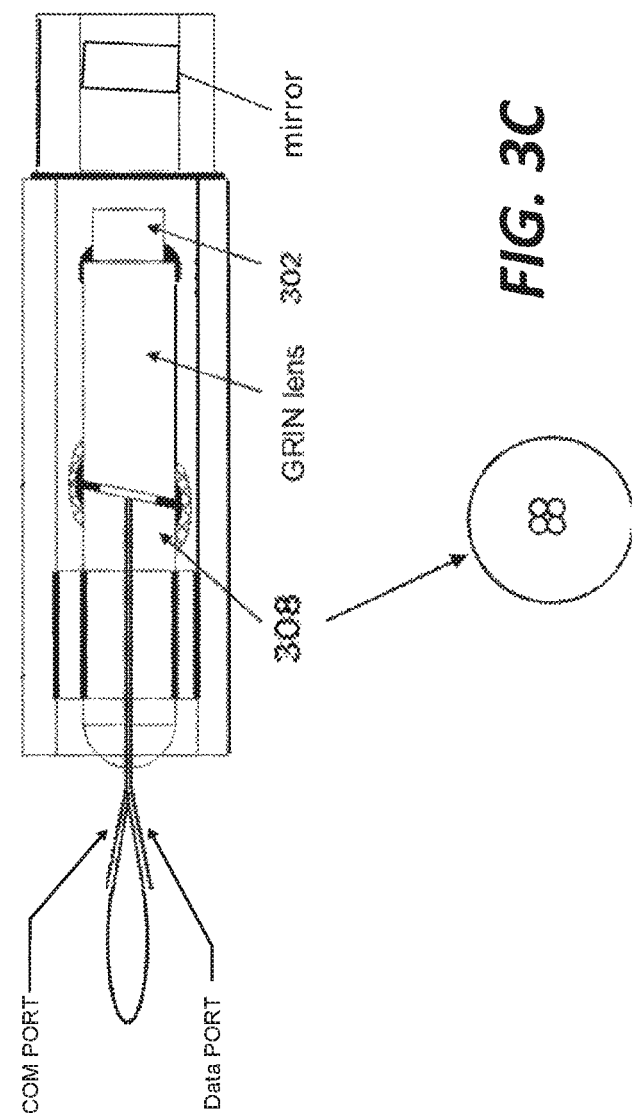
FIG. 3C shows an improvement over FIG. 3A that improves the data port isolation by using a quad fiber pigtail in the small tubular device.

FIG. 3C shows an improvement over FIG. 3A that improves the data port isolation by using a quad fiber pigtail in the small tubular device. The light path to pass through is exactly same as FIG. 3B, but the reflected data signal from the filter 302 is caused to go back to another fiber of the quad fiber pigtail 308 and is reflected from the filter 302 as second reflection, thus the data port isolation is enhanced by this double reflection (each reflection has 20 dB isolation) and the final isolation for this design for data port is 40 dB. Thus the design in FIG. 3C has 40 dB data port isolation and 80 dB data signal return loss in retro com port.

Figure 3D:
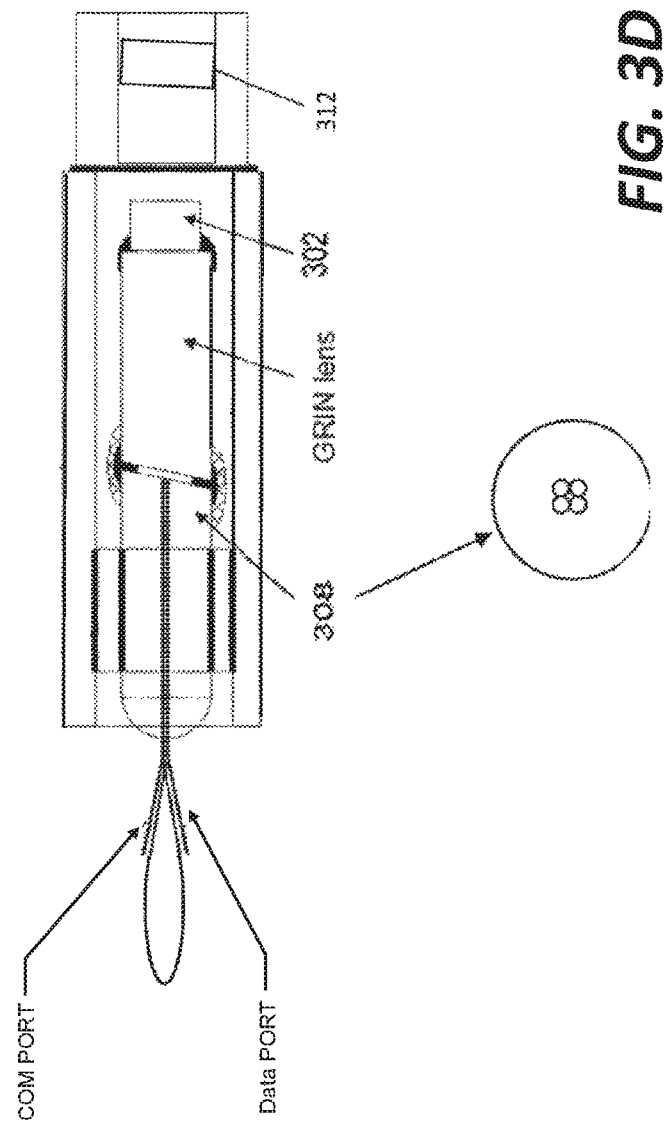
FIG. 3D shows an improvement over FIG. 3C by replacing the mirror with the filter 312. The light path of passing through is exactly same as the path in FIG. 3C.

FIG. 3D shows an improvement over FIG. 3C by replacing the mirror with the filter 312. The light path of passing through is exactly same as the path in FIG. 3C. The light path of reflecting is exactly same as the path in FIG. 2B. Thus the design in FIG. 3D has 40 dB data port isolation and 100 dB data signal return loss in retro com port.

Figure 4A:
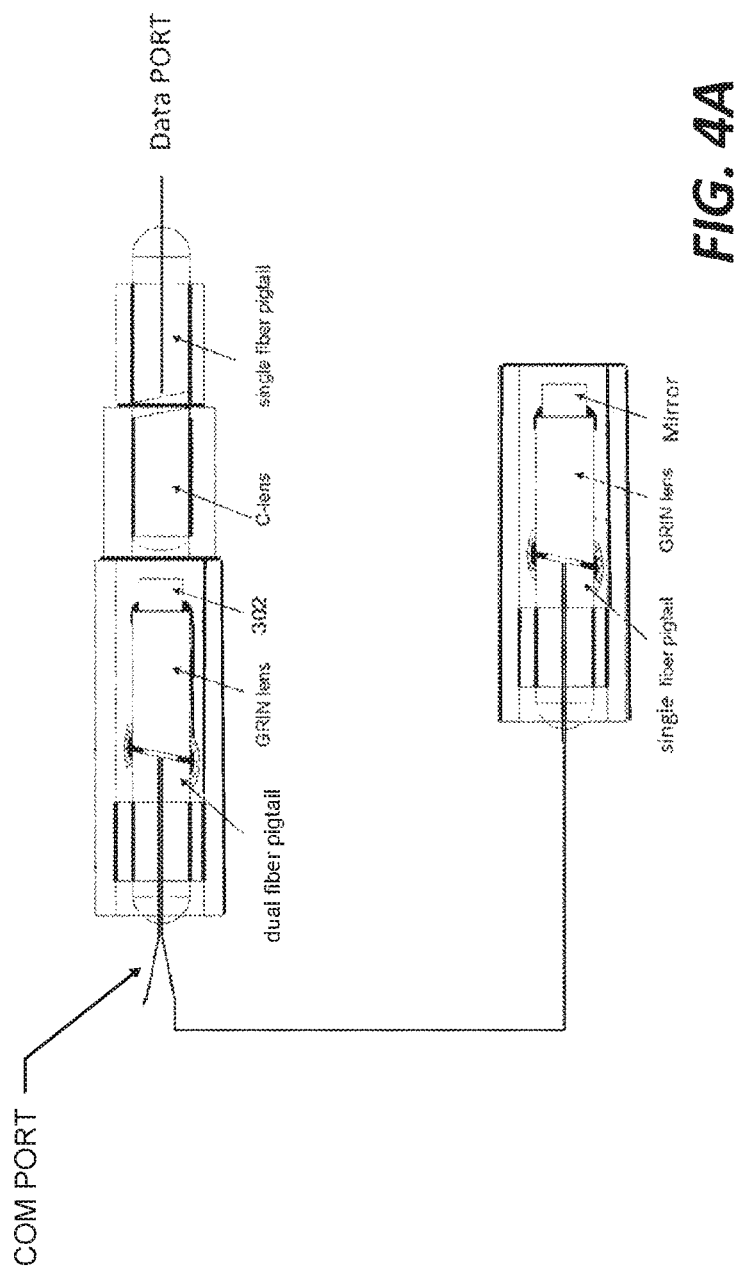
FIG. 4A shows a device made of two mini tubular devices, where the two mini tubular devices are spliced together to achieve the high isolation in data port and high return loss in retro reflected com port.

Referring now to FIG. 4A, it shows a device made of two mini tubular devices 401 and 403. The two mini tubular devices 401 and 403 are spliced together to achieve the high isolation in data port and high return loss in retro reflected com port. As shown in FIG. 4A, the data signal goes through filter 302 and enters the data port with isolation of 40 dB, the OTDR signal reflected on filter 302 and comes out from the dual fiber on com port side and then enter the single fiber tubular device 303. This OTDR signal is reflected by the mirror and goes back to filter 302 one more time and eventually retro reflected back to the com port. With such configuration, this embodiment has 40 dB data port isolation and 40 dB data signal return loss in retro com port.

Figure 4B:
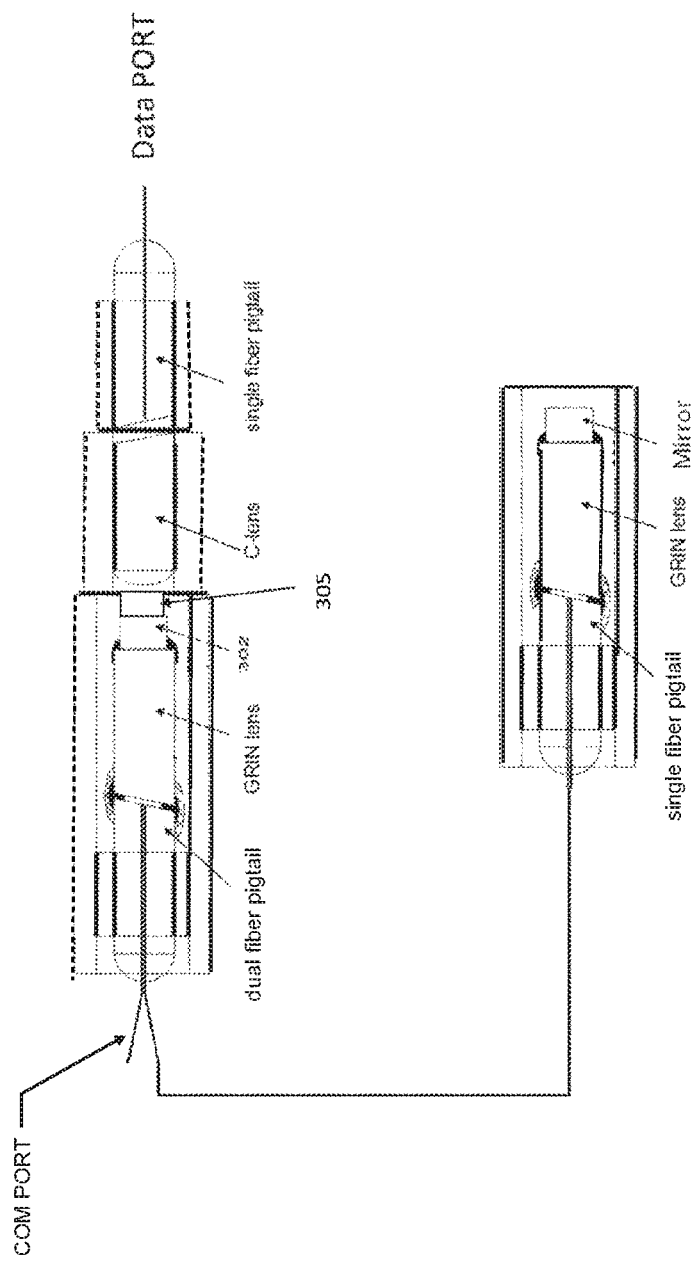
FIG. 4B shows an improvement over FIG. 4A by adding a second filter in series to another filter to make double filtering.

FIG. 4B shows an improvement over FIG. 4A by adding a second filter 305 in series to the filter 302 to make double filtering, the data signal passes through the filter 302 twice to enhance the isolation while the OTDR signal path goes exactly same as FIG. 4A. Thus the design in FIG. 4B has 80 dB data port isolation and 40 dB data signal return loss in the retro reflected com port.

Figure 4C:
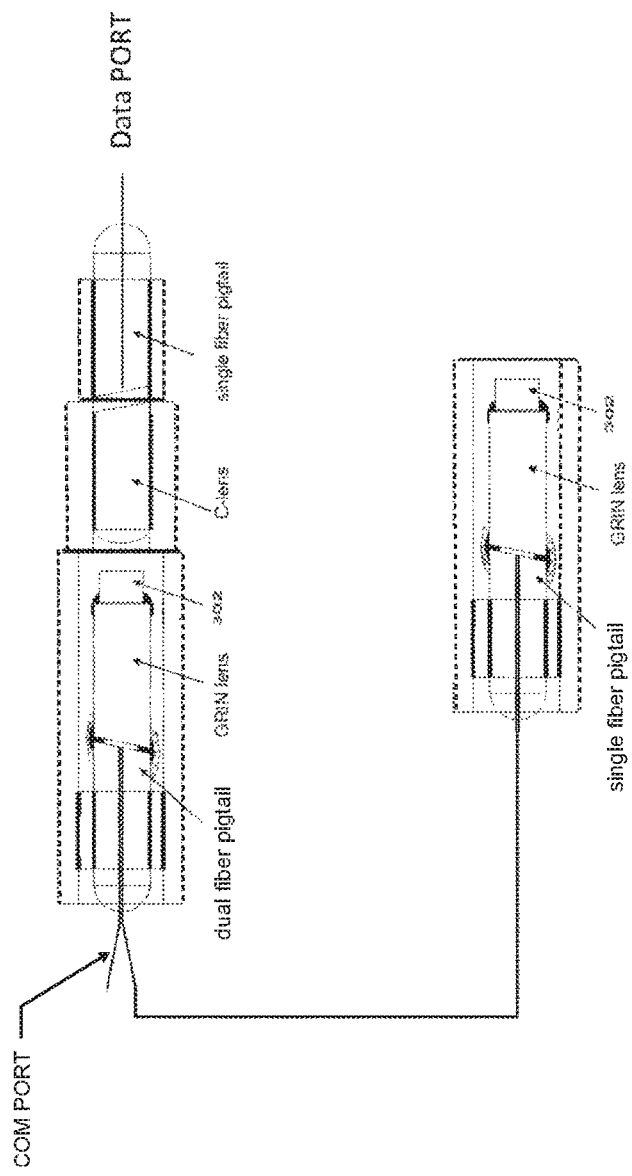
FIG. 4C shows an improvement over FIG. 4A by replacing a mirror with a thin film filter.

FIG. 4C shows an improvement over FIG. 4A by replacing the mirror with a thin film filter 302 then the OTDR signal will be enhance by 20 dB additional return loss for data signal while the data signal will pass through the filter 302 exactly same as in FIG. 4A. Thus the design in FIG. 4C has 40 dB data port isolation and 60 dB data signal return loss in the retro reflected com port.

Figure 4D:
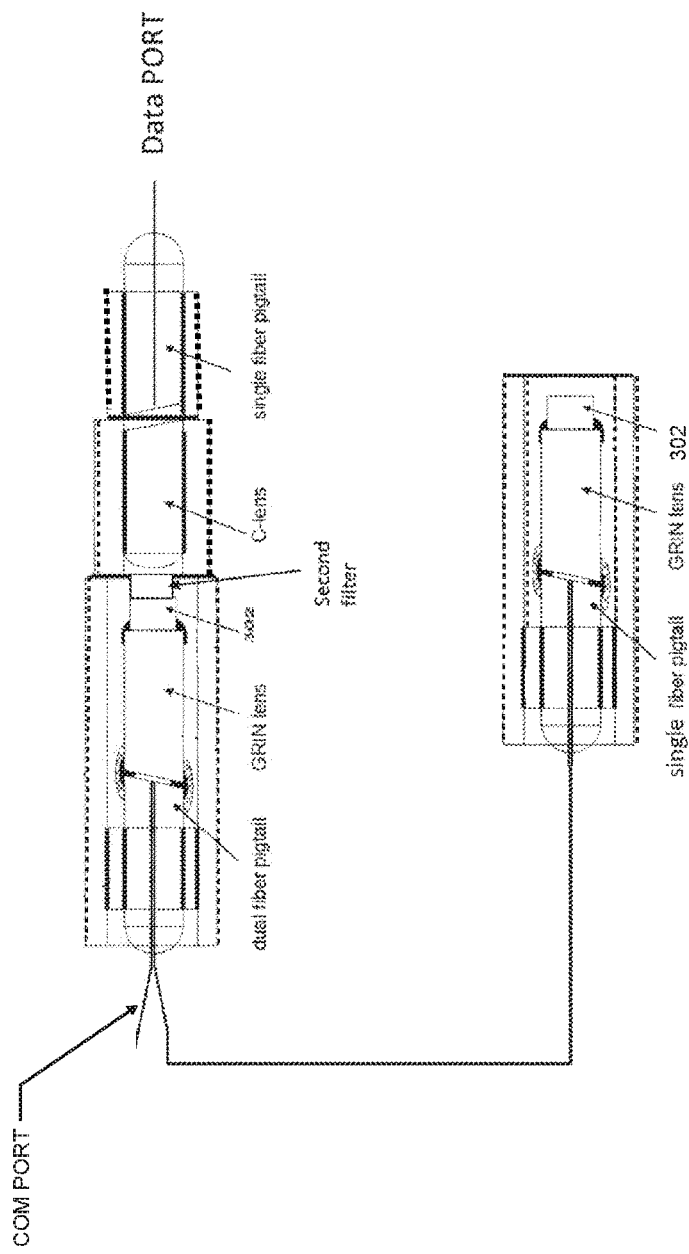
FIG. 4D shows an improvement over FIG. 4B by replacing the mirror with a thin film filter.
Figure 5A:
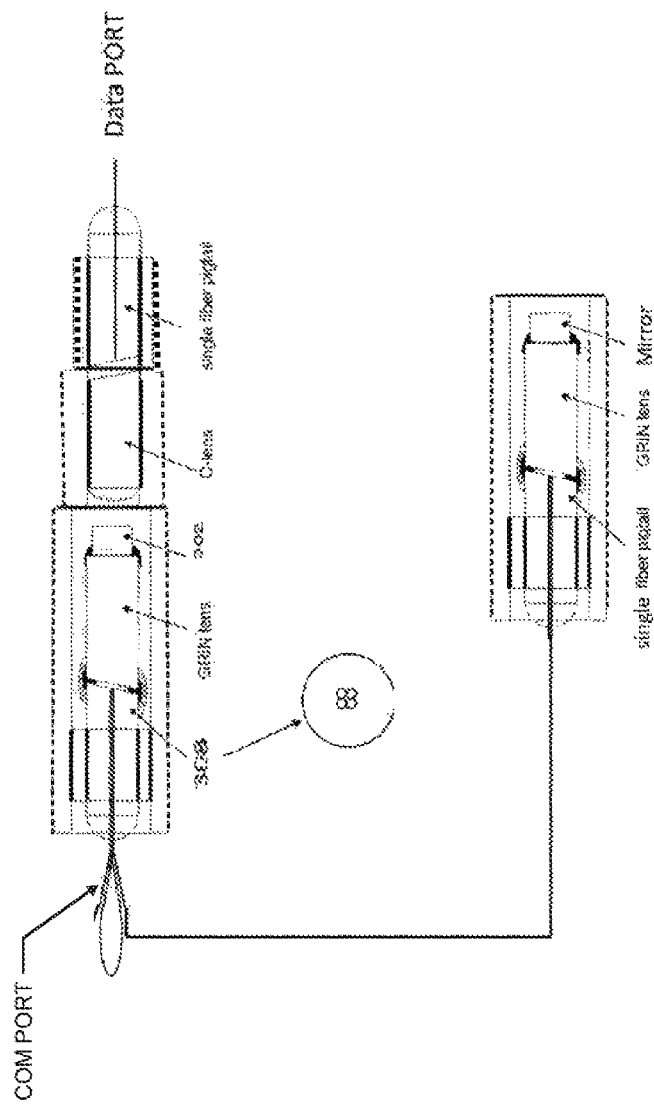
FIG. 5A-FIG. 5D show the use of a quad fiber pigtail respectively in each of the designs in FIG. 4A-FIG. 4D.
Figure 5B:
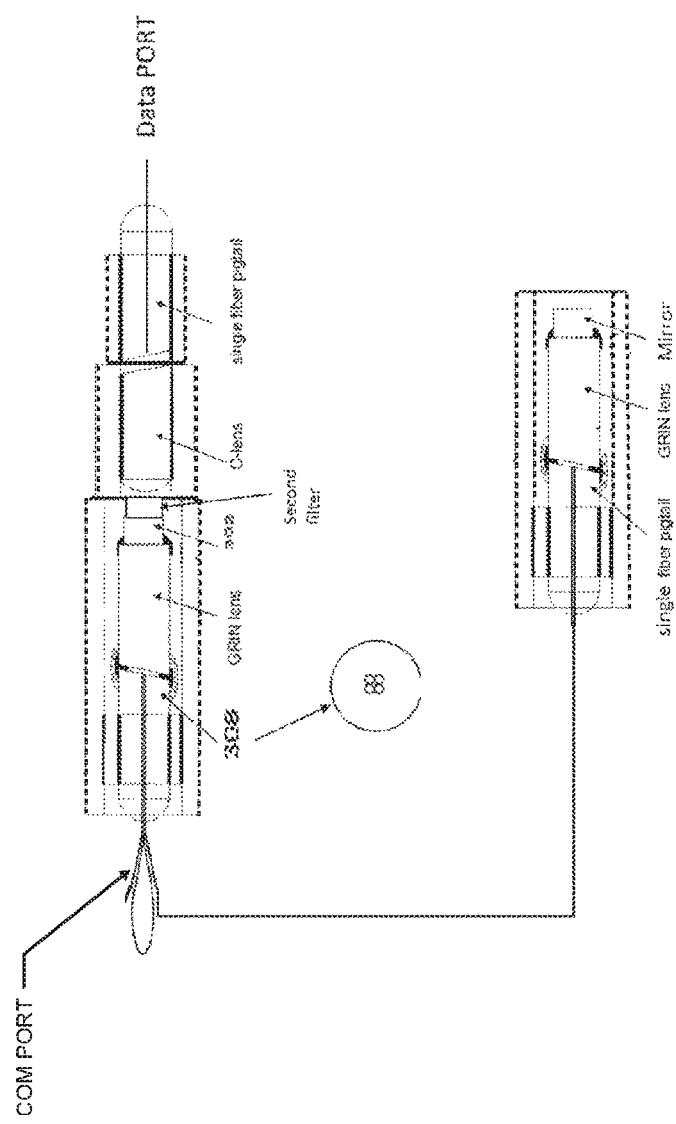
Figure 5C:
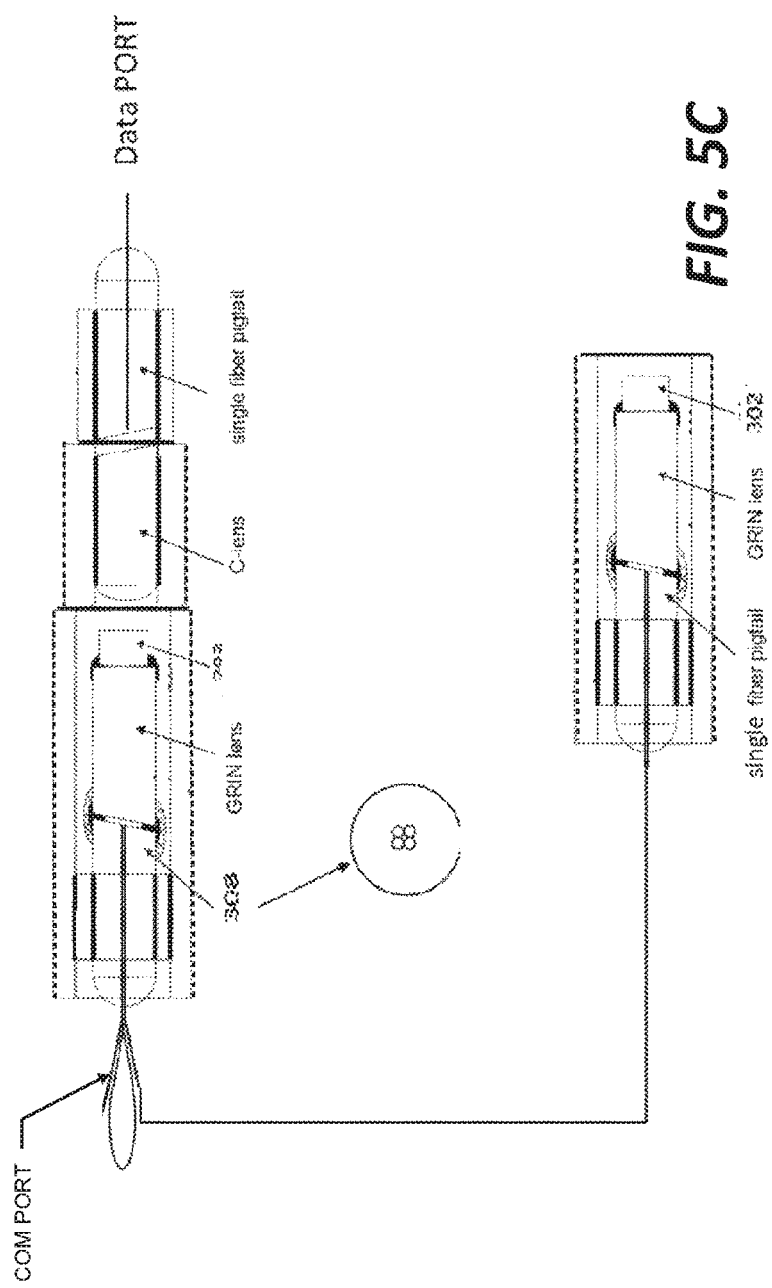
Figure 5D:
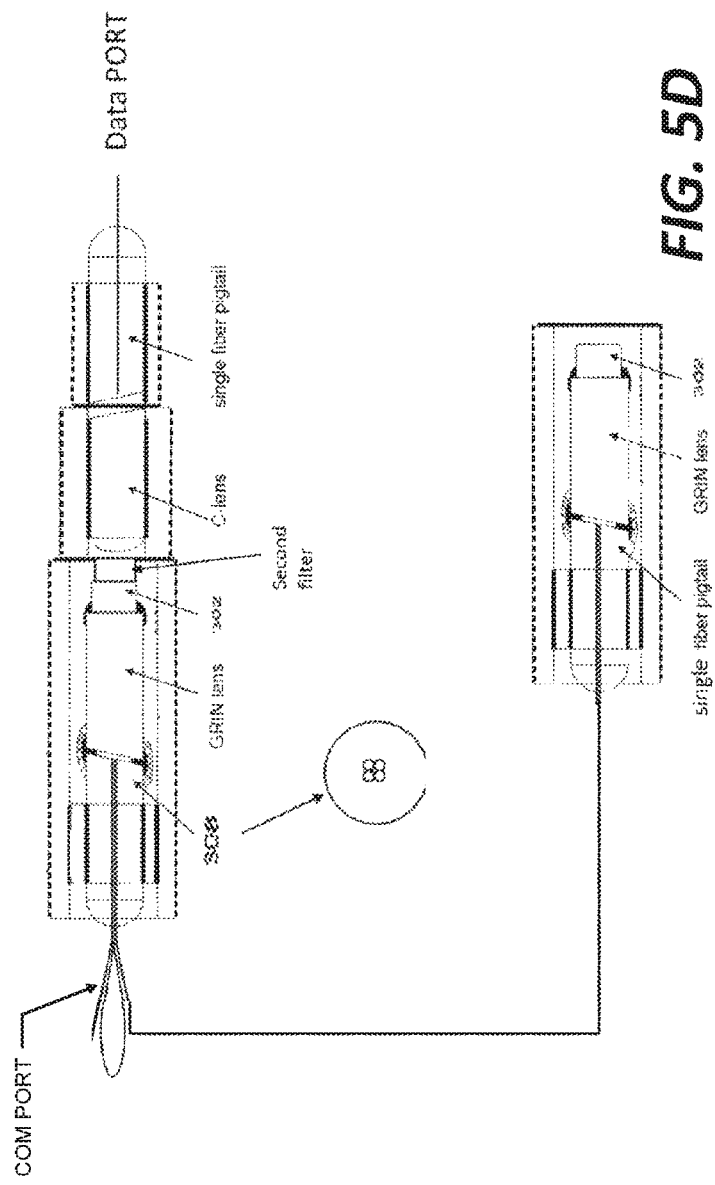

FIG. 4D shows an improvement over FIG. 4B by replacing the mirror with a thin film filter 302 then the OTDR signal will be enhanced by 20 dB additional return loss for the data signal while the data signal passes through the filter 302 twice as exactly as in FIG. 4B. Thus this design has 80 dB data port isolation and 60 dB data signal return loss in retro reflected com port.

FIG. 5A-FIG. 5D show the use of a quad fiber pigtail respectively in each of the designs in FIG. 4A-FIG. 4D. As explained above, the introduction of such a quad fiber pigtail is to increase the isolation, resulting in 40 dB data port isolation and 80 dB data signal return loss in the retro reflected com port in FIG. 5A, 80 dB data port isolation and 80 dB data signal return loss in the retro reflected com port in FIG. 5B, 40 dB data port isolation and 100 dB data signal return loss in the retro reflected com port in FIG. 5C, and 80 dB data port isolation and 100 dB data signal return loss in the retro reflected com port in FIG. 5D.

Figure 6:
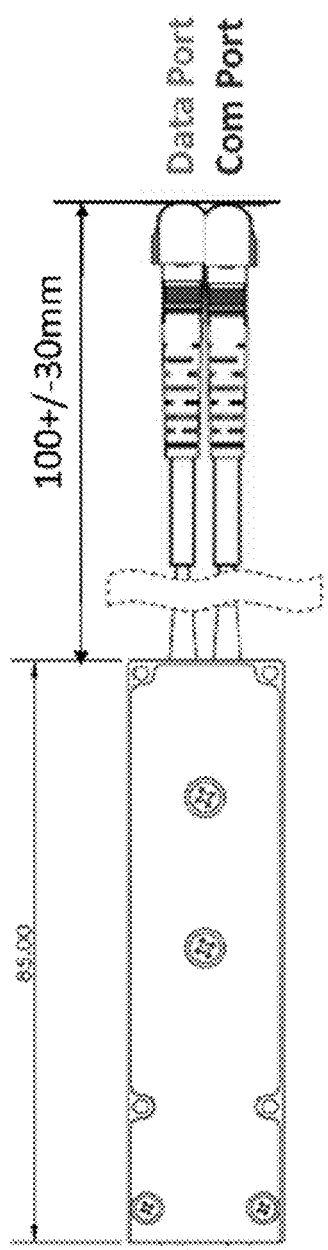
FIG. 6 shows a cassette design encapsulating all the parts shown in the previous figures.

For completeness, FIG. 6 shows a cassette design encapsulating all the parts shown in the previous figures. In one embodiment, all the parts are packaged in a small ruggedized cassette with a 2-mm jacket protected cable for various tough environment deployment.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

What we claim is:

1. A two-port optical retro-reflector comprising:
    a com port for receiving an incoming optical signal comprising a pass-through signal and a retro reflect signal;
    a data port;
    a first wavelength selective optical filter;
    a lens designed to direct the incoming optical signal from the first com port to the first wavelength selective optical filter, wherein the first wavelength selective optical filter is designed to transmit the pass-through signal through the optical filter to the data port and reflect the retro reflect signal to an optical device comprising a fiber pigtail, a second lens, and a reflector designed such that the retro reflect signal impinges upon the reflector via the fiber pigtail and the second lens, and is reflected back to the first wavelength selective optical filter via the fiber pigtail and the second lens for reflection back to the com port by the first wavelength selective optical filter.

2. The two-port optical retro-reflector as recited in claim 1, wherein the reflector comprises a second wavelength selective optical filter that is identical to the first wavelength selective optical filter in optical filter characteristics.

3. The two-port optical retro-reflector as recited in claim 2, wherein the retro reflect signal is filtered by the first and second wavelength selective optical filters, resulting in multiple filtering to increase return loss of the second signal.

4. The two-port optical retro-reflector as recited in claim 1, further comprising a dual fiber pigtail for the com port and for coupling the reflected retro reflect signal to the device comprising the reflector.

5. The two-port optical retro-reflector as recited in claim 1, further comprising an optical loop designed to return the pass-through signal back to the first wavelength selective optical filter.

6. The two-port optical retro-reflector as recited in claim 5, further comprising a quad fiber pigtail, wherein two fibers of the quad fiber pigtail are for the com port and for coupling the reflected retro reflect signal to the optical device comprising the reflector, and two fibers of the quad fiber pigtail form the optical loop.

7. The two-port optical retro-reflector as recited in claim 1, wherein the two-port optical retro-reflector is package in a ruggedized cassette with a 2-mm jacket protected cable for various tough environment deployment.

8. The two-port optical retro-reflector as recited in claim 7, wherein the first and second ports are both disposed on one side of the ruggedized cassette, and enclosed in the 2-mm jacket protected cable.

* * * * *